US011467181B2

(12) United States Patent
Liukku et al.

(10) Patent No.: US 11,467,181 B2
(45) Date of Patent: Oct. 11, 2022

(54) LOW-NOISE MULTI-AXIS MEMS ACCELEROMETER

(71) Applicant: MURATA MANUFACTURING CO., LTD., Nagaokakyo (JP)

(72) Inventors: Matti Liukku, Helsinki (FI);
Ville-Pekka Rytkönen, Klaukkala (FI);
Anssi Blomqvist, Helsinki (FI)

(73) Assignee: MURATA MANUFACTURING CO., LTD., Nagaokakyo (JP)

( * ) Notice: Subject to any disclaimer, the term of this patent is extended or adjusted under 35 U.S.C. 154(b) by 0 days.

(21) Appl. No.: 17/015,515

(22) Filed: Sep. 9, 2020

(65) Prior Publication Data
US 2021/0072280 A1    Mar. 11, 2021

(30) Foreign Application Priority Data
Sep. 11, 2019   (FI) ...................................... 20195753

(51) Int. Cl.
*G01P 15/125*   (2006.01)
*G01P 15/18*    (2013.01)
*G01P 15/08*    (2006.01)

(52) U.S. Cl.
CPC ............ *G01P 15/125* (2013.01); *G01P 15/18* (2013.01); *G01P 2015/0814* (2013.01); *G01P 2015/0831* (2013.01); *G01P 2015/0848* (2013.01)

(58) Field of Classification Search
CPC ........ G01P 15/125; G01P 15/18; G01P 15/08; G01P 15/0802; G01P 2015/0814; G01P 2015/0831; G01P 2015/0848
See application file for complete search history.

(56) References Cited

U.S. PATENT DOCUMENTS

| 5,894,091 A | 4/1999 | Kubota |
| 6,845,670 B1 * | 1/2005 | McNeil ................. G01P 15/125 |
| | | 73/510 |
| 2002/0112538 A1 | 8/2002 | Pinter et al. |

(Continued)

FOREIGN PATENT DOCUMENTS

| DE | 10 2009 000 729 A1 | 8/2010 |
| EP | 2 643 702 A1 | 10/2013 |

(Continued)

OTHER PUBLICATIONS

Finnish Search Report dated Mar. 23, 2020 corresponding to Finnish Patent Application No. 20195753.

(Continued)

*Primary Examiner* — Helen C Kwok
(74) *Attorney, Agent, or Firm* — Squire Patton Boggs (US) LLP

(57) ABSTRACT

The present invention provides a high-accuracy low-noise MEMS accelerometer by using at least two symmetric out-of-plane proof masses for both out-of-plane and in-plane axes. Movement of the proof masses in one or more in-plane sense axes is measured by comb capacitors with mirrored comb electrodes that minimise cross-axis error from in-plane movement of the proof mass out of the sense axis of the capacitor. The two out-of-plane proof masses rotate in opposite directions, thus maintaining their combined centre of mass at the centre of the accelerometer even as they rotate out of plane.

13 Claims, 3 Drawing Sheets

(56) References Cited

U.S. PATENT DOCUMENTS

| | | | |
|---|---|---|---|
| 2009/0031809 A1* | 2/2009 | Lin | G01P 15/125 73/514.32 |
| 2009/0107238 A1* | 4/2009 | Guo | G01P 15/0802 73/514.32 |
| 2009/0241662 A1* | 10/2009 | Supino | G01C 19/5719 73/504.12 |
| 2009/0314085 A1 | 12/2009 | Stahl et al. | |
| 2010/0107763 A1* | 5/2010 | Lin | G01P 15/18 73/514.32 |
| 2010/0122579 A1* | 5/2010 | Hsu | G01P 15/18 73/514.32 |
| 2010/0257933 A1* | 10/2010 | Verjus | G01P 15/125 73/504.04 |
| 2010/0281980 A1* | 11/2010 | Yazawa | G01P 15/0802 73/514.32 |
| 2011/0023606 A1 | 2/2011 | Burghardt et al. | |
| 2012/0017681 A1* | 1/2012 | Reinmuth | G01P 15/125 73/514.35 |
| 2013/0192364 A1* | 8/2013 | Acar | G01C 19/5733 73/504.12 |
| 2013/0192371 A1* | 8/2013 | Rytkonen | G01P 15/18 73/514.32 |
| 2013/0214367 A1* | 8/2013 | van der Heide | G01P 15/08 257/415 |
| 2014/0144235 A1* | 5/2014 | Suzuki | G01P 15/125 73/514.32 |
| 2015/0268268 A1* | 9/2015 | Liu | G01P 15/125 73/514.32 |
| 2016/0097792 A1* | 4/2016 | Naumann | G01P 15/18 73/504.02 |
| 2016/0169927 A1* | 6/2016 | Lin | G01P 15/18 73/488 |
| 2016/0187371 A1 | 6/2016 | Sakai et al. | |
| 2016/0370182 A1* | 12/2016 | Shao | G01C 19/5769 |
| 2017/0023608 A1* | 1/2017 | Tang | G01P 15/125 |
| 2017/0184628 A1 | 6/2017 | Hsu et al. | |
| 2017/0363655 A1 | 12/2017 | Zhang | |
| 2018/0038887 A1 | 2/2018 | Zhang et al. | |
| 2018/0188283 A1 | 7/2018 | Mohammed et al. | |
| 2018/0238925 A1* | 8/2018 | Acar | G01P 15/18 |
| 2019/0064203 A1 | 2/2019 | Tanaka | |
| 2019/0162754 A1 | 5/2019 | Tanaka | |
| 2020/0018777 A1* | 1/2020 | Liukku | G01P 15/125 |
| 2020/0132716 A1* | 4/2020 | Zhang | G01P 15/18 |
| 2020/0355722 A1* | 11/2020 | Zou | G01P 15/125 |

FOREIGN PATENT DOCUMENTS

| | | |
|---|---|---|
| EP | 3044541 A1 | 7/2016 |
| EP | 3239723 A1 | 11/2017 |
| WO | WO 2009/099124 A1 | 8/2009 |
| WO | WO 2010/032818 A1 | 3/2010 |

OTHER PUBLICATIONS

Finnish Search Report dated Jun. 2, 2020 corresponding to Finnish Patent Application No. 20195849.

European Search Report dated Jan. 20, 2021 corresponding to European Patent Application No. 20195500.

European Search Report dated Jan. 28, 2021 corresponding to European Patent Application No. 20190424.

U.S. Office Action corresponding to related U.S. Appl. No. 17/015,539, dated Aug. 31, 2021.

Japanese Office Action corresponding to JP Application No. 2020-149891, dated Oct. 5, 2021.

\* cited by examiner

LOW-NOISE MULTI-AXIS MEMS ACCELEROMETER

TECHNICAL FIELD

The present invention relates to MEMS (microelectromechanical systems) accelerometers, in particular to an accelerometer designed to reduce noise in the accelerometer output.

BACKGROUND

When used to support autonomous driving, MEMS accelerometers must be highly accurate and have low noise in their outputs. High accuracy accelerometers, such as those used in electronic stability control systems, generally require independence of each of the sense axes—i.e. an individual proof mass for each sense axis—in order to reduce inaccuracies that result from cross-axis interference. However, the use of individual proof masses for the sense axes reduces the maximum size of each individual proof masses since MEMS systems are generally subject to significant size constraints. As a result of the smaller proof masses, the accelerometer is more susceptible to noise. Other MEMS accelerometers, such as those used in smartphones, often use a single proof mass for multiple axes in order to keep the complexity of the system (and therefore cost) down. While this enables a larger proof mass to be used, these accelerometers are highly susceptible to cross-axis error and parasitic modes of movement of the proof mass, which significantly reduce the accuracy of these accelerometers.

SUMMARY OF THE INVENTION

The present invention provides a high-accuracy low-noise MEMS accelerometer by using the at least two symmetric out-of-plane proof masses—preferably see-saw type proof masses—for both the out-of-plane and in-plane axes. Movement of the proof masses in one or more in-plane sense axes is measured by comb capacitors with mirrored comb electrodes that minimise cross-axis error from in-plane movement of the proof mass out of the sense axis of the capacitor. The two out-of-plane proof masses rotate in opposite directions, thus maintaining their combined centre of mass at the centre of the accelerometer even as they rotate out of plane. As a result, external acceleration does not produce a torque on the combined proof masses, reducing parasitic modes of movement and improving accuracy. Furthermore, the total mass of the out-of-plane proof axes can be used to provide highly accurate low-noise detection of acceleration in the in-plane axes. Thus, for a given size of MEMS accelerometer, the out-of-plane proof masses can be larger because space does not have to be sacrificed to provide separate in-plane proof masses. This enables a smaller accelerometer with the same accuracy/noise performance, or a similarly sized accelerometer with improved accuracy/noise performance.

More specifically, the invention provides a MEMS accelerometer, which comprises:
a substrate, which defines a substrate plane;
at least two proof masses, wherein both proof masses are configured to rotate out of parallel to the substrate plane and move parallel to the substrate plane and wherein the combined centre of mass of the at least two proof masses is at the centre of the accelerometer;
first sense circuitry configured to sense movement of the at least two proof masses parallel to the substrate plane; and
second sense circuitry configured to sense rotation of the at least two proof masses out of parallel to the substrate plane.

The centre of mass of each proof mass is preferably offset from its axis of rotation such that external acceleration in the out-of-plane axis acts upon the asymmetric mass of each proof mass to cause rotation of the proof mass about the axis of rotation and external acceleration in a first axis parallel to the substrate plane acts upon the asymmetric mass and symmetric mass of both proof masses to cause movement of the proof masses parallel to the substrate plane.

The second sense circuitry may comprise one or more moveable electrodes located on each out-of-plane proof mass and stationary electrodes that are in a fixed position relative to the substrate, wherein the moveable electrode and the stationary electrode form a capacitor, the capacitance of which changes as the out-of-plane proof mass rotates about its rotation axis.

The MEMS accelerometer may further comprise at least one in-plane structure configured to move parallel to the substrate plane, wherein the at least two proof masses are rotatably connected to the at least one in-plane structure such that movement of the at least two proof masses parallel to the substrate plane causes movement of the at least one in-plane structure parallel to the substrate plane.

The at least one in-plane structure is preferably anchored to the substrate via springs at one or more anchor points, wherein the springs allow movement of the at least one in-plane proof mass parallel to the substrate plane and resist movement of the at least one in-plane proof mass out of the substrate plane.

The centre of mass of the at least one in plane structure may be advantageously located at the centre of the accelerometer.

The one or more anchor points may be located symmetrically with respect to the combined centre of mass of the at least one in-plane structure and at least two out-of-plane proof masses such that linear acceleration of the MEMS accelerometer produces no overall torque on the combined at least one in-plane structure and at least two proof masses. The one or more anchor points may be advantageously located at or close to the combined centre of mass of the at least one in-plane structure and at least two proof masses.

The at least two proof masses may be connected to the at least one in-plane structure via torsion springs, wherein the torsion springs allow rotation of the at least two proof masses out of parallel to the substrate plane and resist movement of the at least two proof masses parallel to the substrate plane relative to the at least one in-plane structure. The at least two out-of-plane proof masses are preferably located towards the exterior of the MEMS accelerometer relative to the at least one in-plane structure.

The out of plane proof masses may comprise two C-shaped seesaw proof masses which extend around the exterior of the at least one in-plane mass, such that the two C-shaped out-of-plane proof masses are arranged as mirror-images and the proof masses is configured to rotate in opposite direction in response to an external acceleration in the out-of-plane axis. Advantageously, the two C-shaped out-of-plane proof masses may be coupled by at least two springs, wherein at least one spring is disposed at each end of the C shape, such that the springs allow rotation of the two C-shaped out-of-plane proof masses in opposite directions but resist rotation of the two C-shaped out-of-plane proof masses in the same direction.

The first sense circuitry may comprises comb capacitors, wherein one or more stationary electrodes of each comb capacitor are anchored to the substrate and one or more moveable electrodes of each comb capacitor are connected to the at least one in-plane structure, and wherein the MEMS accelerometer is configured to measure movement of the at least two out-of-plane proof masses and at least one in-plane proof mass using differential capacitive measurements.

Each of said comb capacitors may comprise:
a first set of moveable comb teeth that extend away from the at least one in-plane structure in a first direction along a capacitor axis which is parallel to the substrate plane;
a second set of moveable comb teeth that extend away from the at least one in-plane structure in a second direction, opposite the first direction, along the capacitor axis;
a first set of stationary comb teeth opposite to and interdigitated with the first set of moveable comb teeth, wherein the first set of stationary comb teeth extend towards the at least one in-plane structure in the second direction; and
a second set of stationary comb teeth opposite to and interdigitated with the second set of moveable comb teeth, wherein the second set of stationary comb teeth extend towards the at least one in-plane structure in the first direction;
wherein movement of the at least one in-plane structure and at least two proof masses in the first direction causes the first set of moveable comb teeth and first set of stationary comb teeth to move closer together and causes the second set of moveable comb teeth and second set of stationary teeth to move further apart, and wherein movement of the at least one in-plane structure and at least two proof masses in the second direction causes the first set of moveable comb teeth and first set of stationary comb teeth to move further apart and the second set of moveable comb teeth and second set of stationary teeth to move closer together.

Movement of the at least one in-plane structure and at least two proof masses in the first direction may advantageously cause the first set of moveable comb teeth and first set of stationary comb teeth to move closer together by a first distance and causes the second set of moveable comb teeth and second set of stationary teeth to move further apart by the first distance, and wherein movement of the at least one in-plane structure and at least two proof masses in the second direction causes the first set of moveable comb teeth and first set of stationary comb teeth to move further apart by a second distance and the second set of moveable comb teeth and second set of stationary teeth to move closer together by the second distance.

The second sense circuitry preferably comprises eight electrodes disposed on the see-saw proof masses and eight electrodes disposed above or below the see-saw proof masses forming eight gap detection capacitors, each capacitor being formed from one of the see-saw proof mass electrodes and one of the electrodes disposed above or below the see-saw proof masses, wherein:
four electrodes are located on each proof mass;
on each proof mass, a first pair of electrodes is located at a first end of the C-shape of the see-saw proof mass and a second pair of electrodes is located at a second end of the C-shape of the see-saw proof mass; and
within each pair of electrodes, a first electrode is located towards the middle of the C-shape of the see-saw proof mass from the rotation axis of the see-saw proof mass and a second electrode is located towards the end of the C-shape of the see-saw proof mass from the rotation axis of the see-saw proof mass.

Advantageously, acceleration of the accelerometer in the Z direction is measured from the changes in capacitance of the gap detection capacitors using a double differential measurement.

DETAILED DESCRIPTION

Figure 1:
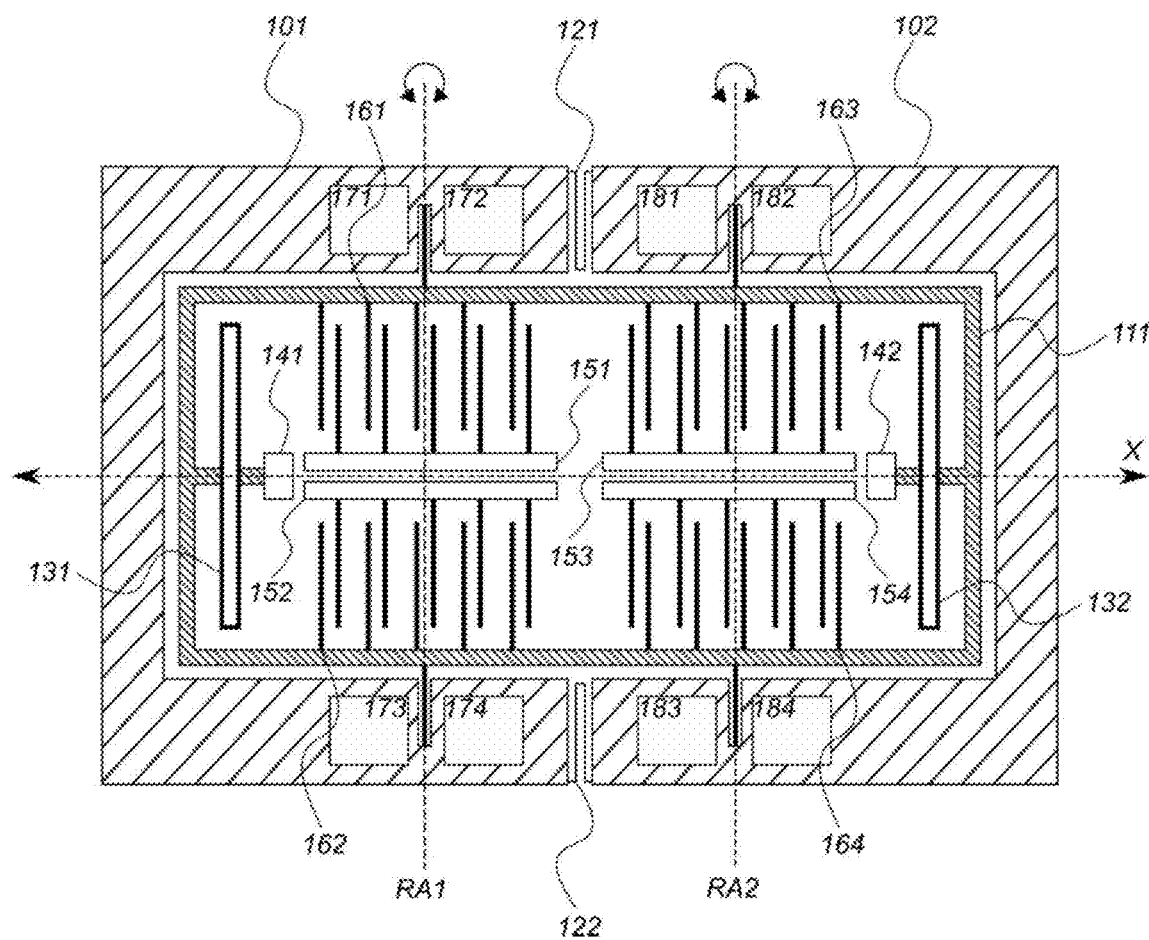
FIG. 1 shows a schematic drawing of a 2-axis accelerometer according to the present invention.

FIG. 1 shows a schematic drawing of a 2-axis MEMS accelerometer according to the present invention. The accelerometer includes two out-of-plane proof masses, 101 and 102, which are preferably see-saw type proof masses. The see-saw proof masses 101, 102 are rotatably coupled to an in-plane structure 111, which is also referred to as an in-plane proof mass, along rotation axes RA1 and RA2.

The in-plane structure 111 and the see-saw proof masses 101, 102 (when at rest) generally lie in a plane referred to as the substrate plane. As is known in MEMS manufacturing, MEMS devices are largely formed by removing material from a layer of material, e.g. silicon, which is referred to as the substrate, to produce the structures such as those depicted and described herein. The "substrate plane" is a geometric plane that intersects the substrate or some/all of the components that have been formed from the substrate parallel to the upper and lower surfaces of the original substrate layer. The substrate plane is therefore parallel to the plane of the page shown in FIG. 1, and may lie above the upper surface of the remainder of the substrate layer following formation of the MEMS features from the substrate. Where the term "in-plane" is used in this disclosure, it is intended to mean an orientation, axis, direction or movement that is oriented in or parallel to the substrate plane. Similarly, the term "out-of-plane" is intended to mean an orientation, axis, direction or movement that has some component in a direction perpendicular to, i.e. out of, the substrate plane. Another way to define the substrate plane is the plane in which the centres of mass of all of the proof masses lie when the accelerometer is at rest.

The see-saw proof masses 101, 102 are connected to the in-plane structure 111 via torsion springs, which allow rotation of the see-saw proof masses 101, 102 out of the substrate plane about rotation axes RA1, RA2. The see-saw proof masses 101, 102 are roughly C- or U-shaped and are arranged such that see-saw proof mass 101 is a mirror image of see-saw proof mass 102 and the proof masses 101, 102 extend around the outside of and enclose the in-plane structure 111. The see-saw proof masses 101, 102 are equally sized.

The rotor rotation axes RA1 and RA2 are positioned within the substrate plane along with the centres of mass of the see-saw proof masses 101, 102. However, the centre of mass of each see-saw proof mass 101, 102 is offset from its rotation axis RA1, RA2 in the substrate plane. In other words, more of the see-saw proof mass 101, 102 lies on one side of the rotation axis RA1, RA2 than on the other side. In this way, the see-saw proof masses 101, 102 each define an asymmetric mass and a symmetric mass. The symmetric mass is the double the mass of the smaller side of the see-saw proof mass 101, 102 (i.e. the mass of the smaller side plus an equal mass from the large side which balances the smaller side). The asymmetric mass is the remaining mass of the see-saw proof mass 101, 102, i.e. the part of the proof mass that is acted upon by the external acceleration (i.e. the acceleration applied to the accelerometer package which is to be measured) to cause rotation of the see-saw proof mass 101, 102 about the rotation axis RA1, RA2. The combined centre of mass of both see-saw proof masses 101, 102 is located at the centre of the accelerometer, along with the centre of mass of the in-plane structure 111.

The see-saw proof masses 101, 102 are coupled together by springs 121 and 122, which are located at the adjacent ends of the see-saw proof masses 101, 102. Springs 121 and 122 permit relative movement of the ends of the see-saw proof masses 101, 102 away from each other parallel to the substrate plane, but resist relative movement of the ends of the see-saw proof masses 101, 102 away from each other perpendicular to the substrate plane. In this way, the see-saw proof masses 101, 102 are generally free to rotate about rotation axes RA1 and RA2 in opposite directions, i.e. see-saw proof mass 101 rotates clockwise and see-saw proof mass 102 rotates anti-clockwise, or vice versa, since this causes relative motion of the ends of the see-saw proof masses 101, 102 away or towards each other parallel to the substrate plane. However, rotation of the see-saw proof masses 101, 102 in the same direction is resisted by the springs 121, 122, since such rotation causes relative motion of the ends of the see-saw proof masses 101, 102 perpendicular to the substrate plane. This coupling prevents the see-saw proof masses 101, 102 from moving in response to external angular acceleration, in which case the see-saw proof masses 101, 102 would rotate in the same direction, while still allowing the see-saw proof masses 101, 102 to move in response to linear acceleration perpendicular to the substrate plane, which causes the see-saw proof masses 101, 102 to rotate in opposite directions.

The in-plane structure 111 is a rigid structure connected via springs 131, 132 to anchor points 141, 142 on the substrate. The anchor points and springs are arranged such that the centre of mass of the in-plane structure 111 and the combined centre of mass of the see-saw proof masses 101, 102 are located at the centre of the accelerometer and the centre of the anchor points. In this way, out-of-plane accelerations do not produce a torque on the in-plane structure 111 or the combined see-saw proof masses 101, 102. The springs 131, 132 permit movement of the in-plane structure 111 along an axis, labelled X, that lies in the substrate plane. Preferably, the springs 131, 132 resist any movement of the in-plane structure 111 that is not along the X-axis, i.e. perpendicular to the X-axis within the substrate plane, and any movement out of the substrate plane, including rotation. The torsion springs connecting the see-saw proof masses 101, 102 to the in-plane structure 11 resist motion of the see-saw proof masses 101, 102 relative to the in-plane structure 111 along any direction in the substrate plane. Thus, the see-saw proof masses 101, 102 can also move along the X-axis along with the in-plane structure in response to acceleration of the accelerometer along the X-axis. Importantly, the combined mass of the symmetric and asymmetric masses of the see-saw proof masses 101, 102 and the in-plane structure are acted upon by external acceleration to cause movement of the see-saw proof masses 101, 102 and in-plane structure 111 relative to the substrate along the X-axis. The amount of noise in the accelerometer output is inversely proportional to the mass of the proof mass, therefore a higher proof mass for the in-plane X axis reduces the noise in the accelerometer output. Furthermore, for a given package size of MEMS accelerometer, the out-of-plane proof masses can be larger because space does not have to be sacrificed to provide separate in-plane proof masses. This enables a similarly sized accelerometer with improved accuracy/noise performance or a smaller accelerometer with the same accuracy/noise performance.

Movement of the see-saw proof masses 101, 102 and/or the in-plane structure 111 is measured capacitively. Rotation of the see-saw proof masses 101, 102 can be measured by gap detection capacitors located above or below the see-saw proof masses 101, 102 (not shown in FIG. 1), or can be measured by comb capacitors with moveable electrodes located on the see-saw proof masses 101, 102 and stationary electrodes located on the in-plane structure 111 (also not shown in FIG. 1). Preferably, gap-detection capacitors are formed between each of the electrodes 171-174 and 181-184, disposed on the see-saw proof masses 101, 102, and counterpart electrodes formed on the substrate or cap wafer (not shown) above or below the see-saw proof masses 101, 102. The electrodes 171-174 are located on the first see-saw proof mass 101, with a pair of electrodes 171, 172 located at a first end of the C-shape of the see-saw proof mass 101 and a second pair of electrodes 173, 174 located at a second end of the C-shape of the see-saw proof mass 101. Within each pair 171, 172 and 173, 174, one electrode 171, 173 is located towards the middle of the C-shape of the see-saw proof mass 101 from the rotation axis RA1; the other electrode 172, 174 is located towards the end of the C-shape of the see-saw proof mass 101 from the rotation axis RA1. Similarly, the electrodes 181-184 are located on the second see-saw proof mass 102, with a pair of electrodes 181, 182 located at a first end of the C-shape of the see-saw proof mass 102 and a second pair of electrodes 183, 184 located at a second end of the C-shape of the see-saw proof mass 102. Within each pair 181, 182 and 183, 184, one electrode 182, 184 is located towards the middle of the C-shape of the see-saw proof mass 102 from the rotation axis RA2; the other electrode 181, 183 is located towards the end of the C-shape of the see-saw proof mass 102 from the rotation axis RA2.

In ideal conditions, when the capacitors formed from electrodes 171-174 and 181-184 are used to measure movement of the see-saw proof masses 101, 102 out of parallel to the substrate plane (i.e. orthogonal to the substrate plane), in-plane movement of the see-saw proof masses 101, 102 does not affect the out-of-plane capacitance measurement as long as the area of overlap between the electrodes 171-174, 181-184 and the corresponding electrodes above/below the see-saw proof masses 101, 102 does not change, i.e. if the electrodes 171-174, 181-184 or plate electrodes above and/or below the see-saw proof masses 101, 102 cover a large enough area.

In practice, alignment of the electrodes 171-174, 181-184 and the corresponding electrodes above/below the see-saw proof masses 101, 102 may not be perfectly parallel, e.g. due to imperfect alignment of the cap wafer during manufacturing or stress on the device during operation. Under such conditions, in-plane movement of the proof masses 101, 102 may cause changes in the individual capacitances measured by each of the individual capacitors formed from electrodes 171-174 and 181-184. However, taking a single and double differential measurements of the capacitance changes cancels out any such changes.

For example, if the counterpart electrodes are located on the cap wafer and the cap wafer is out of alignment so that the cap wafer electrodes on the left hand side are closer to the see-saw proof mass electrodes 171, 173 than the cap wafer electrodes are to the see-saw proof mass electrode 182, 184, then movement of the see-saw proof masses in the X direction would result in a change of capacitance as the electrodes moved closer together or further apart due to the mis-alignment. Similarly, if the counterpart electrodes are located on the cap wafer and the cap wafer is out of alignment so that the cap wafer electrodes on the bottom side are closer to the see-saw proof mass electrodes 173, 174, 183, 184 than the cap wafer electrodes are to the see-saw proof mass electrodes 171, 172, 181, 182, then movement of the see-saw proof masses in the Y direction would result in a change of capacitance as the electrodes moved closer together or further apart due to the mis-alignment. These effects would produce an unwanted signal indicating fictitious acceleration in the Z direction.

However, the capacitance can be measured according to the following formula:

$$(C_{171}-C_{172})+(C_{173}-C_{174})+(C_{182}-C_{181})+(C_{184}-C_{183})$$

Where $C_{171}$ indicates the change in capacitance of the capacitor formed from the electrode 171 and its counterpart electrode above/below the see-saw proof mass 101. Within each single differential, e.g. $C_{171}-C_{172}$, any change in capacitance due to movement of the see-saw proof masses 101, 102 in the Y direction is cancelled out, since the capacitance of the capacitor formed from electrode 171 is equally affected by the Y direction movement as the capacitor formed from electrode 172.

Movement of the see-saw proof masses 101, 102 in the X direction causes equal difference in the change in capacitance between the capacitors formed by each of electrodes 171 and 172 and in the change in capacitance between the capacitors formed by each of electrodes 181 and 182. However, each double differential, i.e. $(C_{171}-C_{172})+(C_{182}-C_{181})$ can be re-written as $(C_{171}-C_{172})-(C_{181}-C_{182})$, thus the error caused by movement in the X direction is also cancelled out.

Thus the arrangement of the electrodes 171-174 and 181-184 on either side of the rotation axes RA1 and RA2, coupled with the opposite directions of rotation of each of the see-saw proof masses 101, 102 allows for any unwanted change in capacitance of the capacitors used for Z axis sensing to be automatically and efficiently cancelled out.

Movement of the in-plane structure 111 and the see-saw proof masses 101, 102 along the X-axis is measured by comb capacitors, with moveable electrodes located on the in-plane structure 111 and stationary electrodes anchored to the substrate (at anchor points 151-154) and located interior to the in-plane structure 111. While an accelerometer including both the arrangement of proof masses described above and the comb capacitor arrangement described below is particularly advantageous, it will be appreciated that both features can be advantageously used independently.

FIG. 1 shows two comb capacitors for measuring movement of the in-plane structure 111 and see-saw proof masses 101, 102 along the X-axis. Each comb capacitor is made up of two pairs of electrodes 161/162 and 163/164. A first moveable electrode in each pair includes comb teeth that extend away from the in-plane structure 111 in a first direction parallel to the substrate plane and perpendicular to the X-axis, towards the middle of the accelerometer. The comb teeth of a second moveable electrode extend from the opposite side of the in-plane structure 111 and extend away from the in-plane structure in a second direction, opposite the first direction, towards the middle of the accelerometer. A first stationary electrode is attached to anchor point 151 located close to or at the middle of the accelerometer. The first stationary electrode's comb teeth extend towards the in-plane structure 111 and are interdigitated with the comb teeth of the first moveable electrode. A second stationary electrode is attached to anchor point 152, also located close to or at the middle of the accelerometer, and its comb teeth extend towards the in-plane structure 111 and are interdigitated with the comb teeth of the second moveable electrode. While FIG. 1 depicts separate anchor points 151, 152 for the two stationary electrodes, it is also possible for the two electrodes to share a common anchor point. The two sets of electrodes 161 and 162 form a single capacitor that has mirror symmetry between the stationary electrodes.

This arrangement of electrodes means that movement of the in-plane structure 111 and see-saw proof masses 101, 102 in the first direction (i.e. down the page, as shown in FIG. 1) causes the first moveable electrode and first stationary electrode to move closer together in the direction parallel to the comb fingers, and causes the second moveable electrode and second stationary electrode to move further apart by the same amount. Thus, the increase in capacitance caused by the increased area of overlap between the first electrodes 161 is offset by an equal decrease in capacitance caused by the decreased area of overlap between the second electrodes 162. Similarly, movement of the in-plane structure 111 and see-saw proof masses 101, 102 in the second direction (i.e. up the page, as shown in FIG. 1) causes the area of overlap between the first moveable electrode and first stationary moveable electrode to decrease and causes the area of overlap between the second moveable electrode and second stationary electrode to increase by the same amount. The decrease in capacitance caused by the decreased overlap between the first electrodes 161 is offset by an equal increase in capacitance caused by the increased overlap between the second electrodes 162. In this way, the accelerometer shown in FIG. 1 passively compensates for cross-axis error, i.e. changes in the capacitance caused by movement perpendicular to the X-axis: the capacitance of the capacitor formed from electrodes 161/162 increases or decreases as the in-plane structure 111 and see-saw proof masses 101, 102 moves along the X-axis (i.e. towards the right of the page, as shown in FIG. 1) as the interdigitated comb teeth of the moveable and stationary electrodes get closer together or further apart, but does not significantly change due to movement perpendicular to the X-axis. The second capacitor formed from electrodes 163, 164 and anchor points 153, 154 is formed in the same manner as the first capacitor formed from electrodes 161, 162 and anchor points 151, 152; however, the second capacitor is a mirror image of the first capacitor about an axis perpendicular to the X-axis, such that as the comb teeth of the first capacitor move closer together due to movement along the X-axis, the comb teeth of the second capacitor move further apart and vice versa. This enables differential capacitive measurements to be used to determine the extent of the movement of the in-plane structure 111 and see-saw proof masses 101, 102, and therefore determine the external acceleration.

Figure 2:
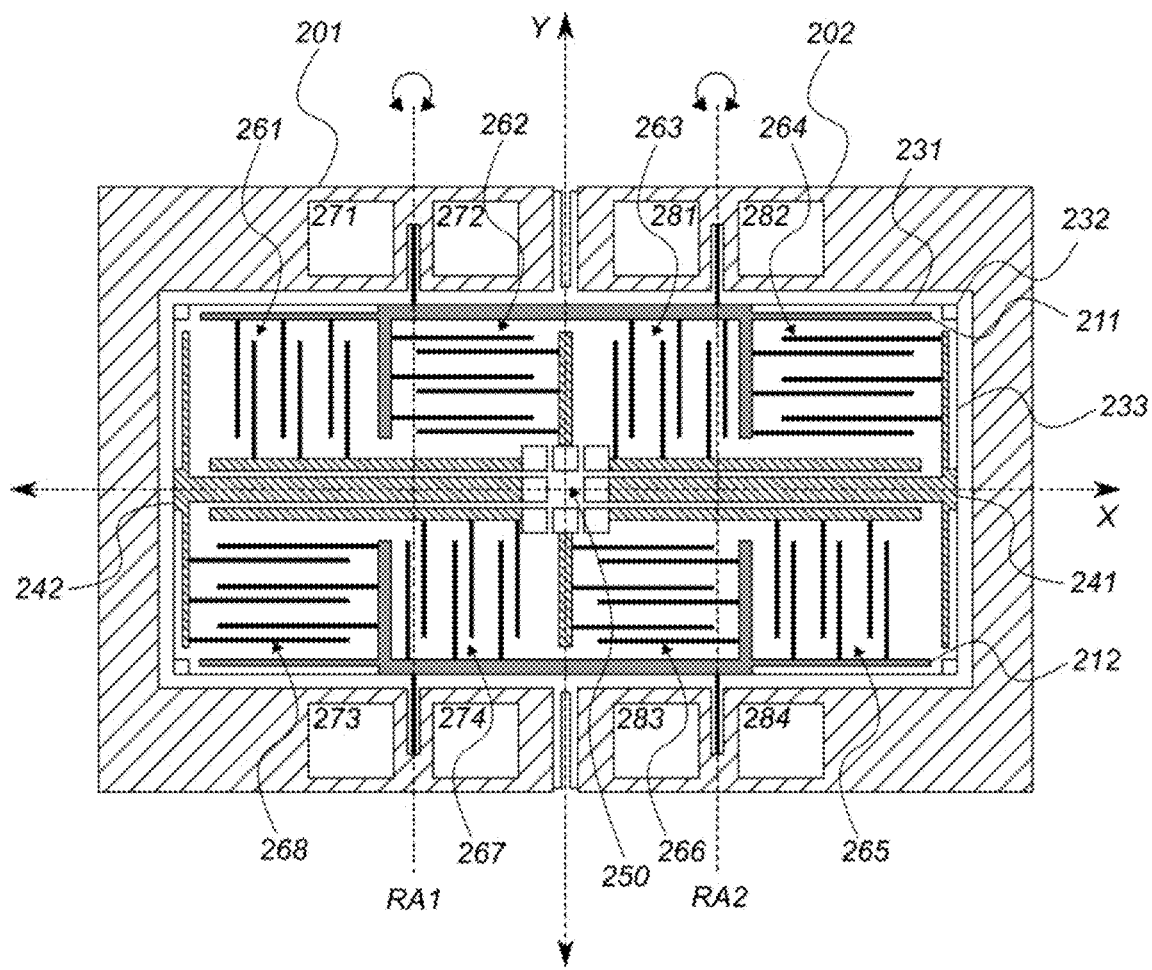
FIG. 2 shows a schematic drawing of a 3-axis accelerometer according to the present invention.

FIG. 2 shows a schematic drawing of a 3-axis accelerometer according to the present invention. See-saw proof masses 201 and 202 are positioned and function in the same manner as described above with respect to see-saw masses 101, 102 in FIG. 1. In contrast to the single in-plane structure 111 of the two-axis accelerometer of FIG. 1, the accelerometer of FIG. 2 includes a first in-plane structure 211 and a second in-plane structure 212 to which the see-saw proof masses 201, 202 are connected. The first 211 and second in-plane structures 212 are suspended from the substrate via springs 231 and 233 and rigid connecting portion 232. The springs 231 are flexible in the Y-direction but rigid in the X-direction, while springs 233 are flexible in the X-direction and rigid in the Y-direction. Both springs 231 and 233 are rigid in the out-of-plane direction. The two springs 231 and 233 are connected by rigid connecting portion 232. Spring 233 is connected at the other end to rigid support structure 241, which is in turn anchored to the substrate at or close to the centre of the accelerometer. This same structure of springs 231, 233 and rigid connection portion 232 is repeated around the accelerometer. In this way, the combined structure of springs 231 and 233 and rigid connecting structure 232 allows the first and second in-plane structures to move relative to the substrate along the X and Y-axes shown in FIG. 2 while resisting movement of the in-plane structures 211 and 212 out of the substrate plane. Furthermore, since the first and second in-plane structures 211, 212 are both connected to both see-saw proof masses 201, 202, the combined structure of first and second in-plane structures 211, 212 and see-saw proof masses 201, 202 moves together in the X- and Y-directions.

Anchor points 250, to which stationary capacitor electrodes of electrode pairs 261-268 and the rigid support structures 241, 242 are fixed, are located at or close to the centre of the accelerometer. As with the two-axis accelerometer of FIG. 1, the anchor points 250 and rigid support structures 241, 242 are arranged such that the combined centre of mass of the in-plane structures 211 and 212 and the combined centre of mass of the see-saw proof masses 201, 202 is located such that out-of-plane accelerations do not produce a torque on the combined in-plane structures 211, 212 or the combined see-saw proof masses 201, 202. Furthermore, by positioning the anchor points 250 close together, close to the centre of the accelerometer, the accelerometer is less sensitive to mechanical deformations of the substrate, e.g. caused by temperature changes.

The three-axis accelerometer depicted in FIG. 2 has four comb capacitors, each made up of two-pairs of interdigitated comb electrodes as described above with respect to FIG. 1. A first capacitor, which is configured to measure motion in the X direction is made up of electrode pairs 261 and 267. A second capacitor, which is configured to measure motion in Y direction, is made up of electrode pairs 262 and 268. A third capacitor, which is configured to measure motion in the X direction, is made up of electrode pairs 263 and 265. A fourth capacitor, which is configured to measure motion in the Y direction, is made up of electrode pairs 264 and 266. As described above with respect to FIG. 1, each of the arrangement and orientation of these electrodes is such that, for each capacitor, as the moveable electrode and stationary electrode of one pair of electrodes move closer together, the moveable electrode and stationary electrode of the other pair of electrodes moves further apart by the same amount. Motion of the see-saw proof masses 201, 202 and the in-plane structures 211, 212 is shown in FIG. 3.

In the same way as for the accelerometer depicted in FIG. 2, the electrodes 271-274 and 281-284 for measuring rotation of the see-saw proof masses 101, 102 are arranged such that movement of the see-saw proof masses 101, 102 in the X-Y plane relative to the substrate either does not cause a change in capacitance of the Z-axis sense capacitors, or if it does, the changes in capacitance is cancelled out in differential or double differential measurement. The description above with respect to electrodes 171-174 and 181-184 applies equally to this embodiment.

Figure 3:
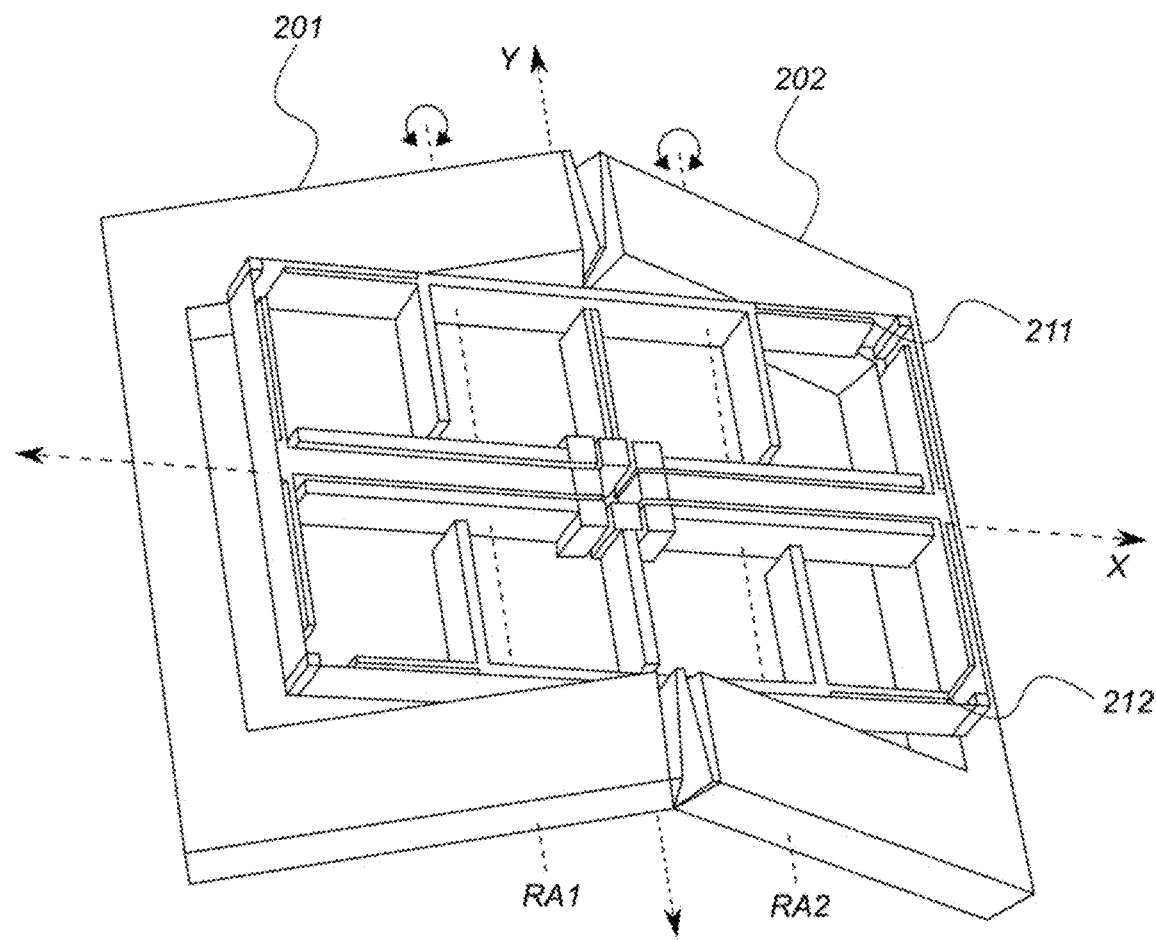
FIG. 3 shows a perspective drawing of the 3-axis accelerometer, demonstrating the movement of the see-saw proof masses out of the substrate plane.

FIG. 3 shows a perspective view of the three-axis accelerometer depicted in FIG. 2, demonstrating the movement of the see-saw proof masses 201, 202. While FIG. 3 depicts the in-plane structures 211 and 212 corresponding to the accelerometer of FIG. 2, it will be appreciated that the see-saw proof masses 101, 102 of the accelerometer shown in FIG. 1 are configured to move in the same manner as the see-saw proof masses 201, 202 of the accelerometer shown in FIG. 2.

The invention claimed is:

1. A MEMS accelerometer, comprising:
  a substrate, which defines a substrate plane;
  at least two out-of-plane proof masses, wherein both out-of-plane proof masses are configured to rotate out of parallel to the substrate plane and move parallel to the substrate plane and wherein a combined center of mass of the at least two out-of-plane proof masses is at a center of the accelerometer;
  at least one in-plane structure configured move parallel to the substrate plane, wherein the at least two out-of-plane proof masses are rotatably connected to the at least one in-plane structure such that movement of the at least two out-of-plane proof masses parallel to the substrate plane causes movement of the at least one in-plane structure parallel to the substrate plane;
  first sense circuitry configured to sense movement of the at least two out-of-plane proof masses parallel to the substrate plane; and
  second sense circuitry configured to sense rotation of the at least two out-of-plane proof masses out of parallel to the substrate plane;
  wherein the at least two out-of-plane proof masses are located towards an exterior of the MEMS accelerometer relative to the at least one in-plane structure;
  wherein the at least two out-of-plane proof masses comprise two C-shaped seesaw proof masses which extend around the exterior of the at least one in-plane structure, such that the two C-shaped seesaw proof masses are configured as mirror-images and the two C-shaped seesaw proof masses are configured to rotate in opposite direction in response to an external acceleration in an out-of-plane axis; and
  wherein the at least one in-plane structure is anchored to the substrate via springs at one or more anchor points, wherein the springs allow movement of the at least one in-plane structure parallel to the substrate plane and resist movement of the at least one in-plane structure out of the substrate plane.

2. The MEMS accelerometer claim 1, wherein a center of mass of each out-of-plane proof mass is offset from an axis of rotation such that:
  external acceleration in an out-of-plane axis acts upon an asymmetric mass of each out-of-plane proof mass to cause rotation of the out-of-plane proof mass about the axis of rotation; and
  external acceleration in a first axis parallel to the substrate plane acts upon the asymmetric mass and a symmetric mass of both out-of-plane proof masses to cause movement of the out-of-plane proof masses parallel to the substrate plane.

3. The MEMS accelerometer of claim 2, wherein the second sense circuitry comprises one or more moveable electrodes located on each out-of-plane proof mass and stationary electrodes that are in a fixed position relative to the substrate, wherein the one or more moveable electrodes and the stationary electrodes form a capacitor, a capacitance of which changes as each out-of-plane proof mass rotates about the rotation axis.

4. The MEMS accelerometer of claim 1, wherein a center of mass of the at least one in-plane structure is located at the center of the accelerometer.

5. The MEMS accelerometer of claim 4, wherein one or more anchor points are located symmetrically with respect to a combined center of mass of the at least one in-plane structure and the at least two out-of-plane proof masses such that linear acceleration of the MEMS accelerometer produces no overall torque on a combined at least one in-plane structure and at least two out-of-plane proof masses.

6. The MEMS accelerometer of claim 1, wherein the one or more anchor points are located at or close to a combined center of mass of the at least one in-plane structure and the at least two out-of-plane proof masses.

7. The MEMS accelerometer of claim 1, wherein the at least two out-of-plane proof masses are connected to the at least one in-plane structure via torsion springs, wherein the torsion springs allow rotation of the at least two out-of-plane proof masses out of parallel to the substrate plane and resist movement of the at least two out-of-plane proof masses parallel to the substrate plane relative to the at least one in-plane structure.

8. The MEMS accelerometer of claim 1, wherein the two C-shaped seesaw proof masses are coupled by at least two springs, wherein the at least two springs are disposed at each end of the C-shaped seesaw proof masses, such that the springs allow rotation of the two C-shaped seesaw proof masses in opposite directions but resist rotation of the two C-shaped seesaw proof masses in a same direction.

9. The MEMS accelerometer of claim 1, wherein the first sense circuitry comprises comb capacitors, wherein one or more stationary electrodes of each comb capacitor are anchored to the substrate and one or more moveable electrodes of each comb capacitor are connected to the at least one in-plane structure, and wherein the MEMS accelerometer is configured to measure movement of the at least two out-of-plane proof masses and the at least one in-plane structure using differential capacitive measurements.

10. The MEMS accelerometer of claim 9, wherein the each comb capacitor comprises:
a first set of moveable comb teeth that extend away from the at least one in-plane structure in a first direction along a capacitor axis which is parallel to the substrate plane;
a second set of moveable comb teeth that extend away from the at least one in-plane structure in a second direction, opposite the first direction, along the capacitor axis;
a first set of stationary comb teeth opposite to and interdigitated with the first set of moveable comb teeth, wherein the first set of stationary comb teeth extend towards the at least one in-plane structure in the second direction; and
a second set of stationary comb teeth opposite to and interdigitated with the second set of moveable comb teeth, wherein the second set of stationary comb teeth extend towards the at least one in-plane structure in the first direction;
wherein movement of the at least one in-plane structure and the at least two out-of-plane proof masses in the first direction causes the first set of moveable comb teeth and the first set of stationary comb teeth to move closer together and causes the second set of moveable comb teeth and the second set of stationary teeth to move further apart, and wherein movement of the at least one in-plane structure and the at least two out-of-plane proof masses in the second direction causes the first set of moveable comb teeth and the first set of stationary comb teeth to move further apart and the second set of moveable comb teeth and the second set of stationary teeth to move closer together.

11. The MEMS accelerometer of claim 10, wherein movement of the at least one in-plane structure and the at least two out-of-plane proof masses in the first direction causes the first set of moveable comb teeth and the first set of stationary comb teeth to move closer together by a first distance and causes the second set of moveable comb teeth and the second set of stationary teeth to move further apart by the first distance, and wherein movement of the at least one in-plane structure and the at least two out-of-plane proof masses in the second direction causes the first set of moveable comb teeth and the first set of stationary comb teeth to move further apart by a second distance and the second set of moveable comb teeth and the second set of stationary teeth to move closer together by the second distance.

12. The MEMS accelerometer of claim 1, wherein the second sense circuitry comprises eight electrodes disposed on the C-shaped seesaw proof masses and eight electrodes disposed above or below the C-shaped seesaw proof masses forming eight gap detection capacitors, each capacitor being formed from one of the electrodes disposed on the C-shaped seesaw proof masses and one of the electrodes disposed above or below the C-shaped seesaw proof masses, wherein:
four of the eight electrodes are located on each C-shaped seesaw proof mass;
on each proof mass, a first pair of electrodes is located at a first end of the C-shape seesaw proof masses and a second pair of electrodes is located at a second end of the C-shape seesaw proof masses; and
within each pair of electrodes, a first electrode is located towards a middle of the C-shape seesaw proof masses from the rotation axis of the C-shape seesaw proof masses and a second electrode is located towards the end of the C-shape seesaw proof masses from the rotation axis of the C-shape seesaw proof masses.

13. The MEMS accelerometer of claim 12, wherein acceleration of the accelerometer in a Z direction is measured from changes in capacitance of the gap detection capacitors using a double differential measurement.

* * * * *